Oct. 8, 1940. H. V. REED 2,217,078
FRICTION CLUTCH
Filed Feb. 3, 1938
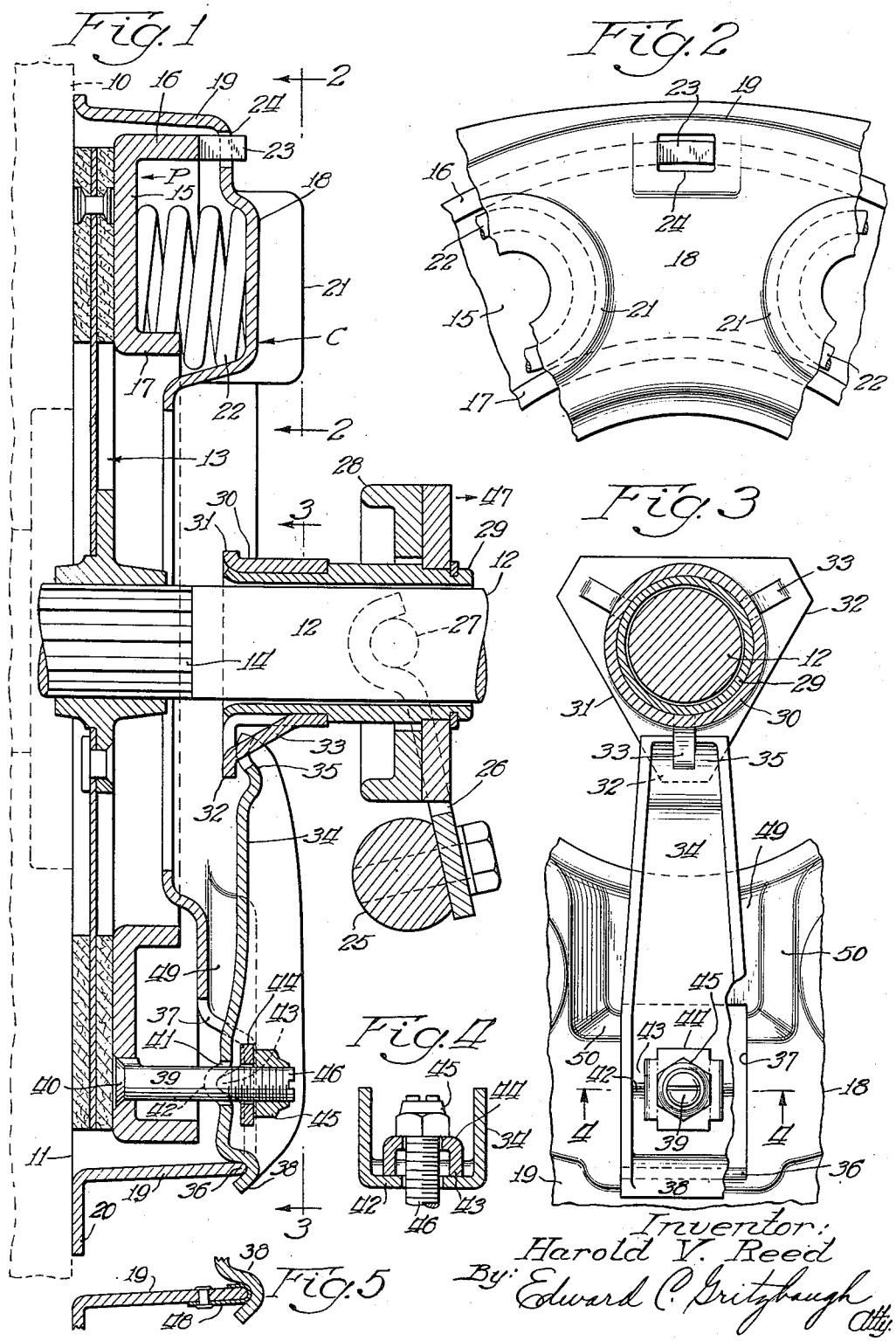
Inventor:
Harold V. Reed
By: Edward C. Gritzbaugh
Atty.

Patented Oct. 8, 1940

2,217,078

UNITED STATES PATENT OFFICE 2,217,078

FRICTION CLUTCH

Harold V. Reed, Chicago, Ill., assignor to Borg-Warner Corporation, Chicago, Ill., a corporation of Illinois Application February 3, 1938, Serial No. 188,483

11 Claims. (Cl. 192—68)

This invention relates to improvements in friction clutches, and has as its general object to provide a clutch formed chiefly of stamped and drawn sheet metal parts, which is of particularly durable construction and which will operate efficiently throughout the normal life span of the average motor vehicle in which it may be installed.

The use of drawn sheet metal parts in clutches, although not new, has been attended with numerous difficulties, particularly where the cover plate is made of drawn sheet metal and the clutch release levers are fulcrumed directly upon the cover plate. In such an assembly, it has been found that the release lever does not always transfer to the pressure plate with accuracy the degree of movement delivered to it by the operating collar because of cover plate deflection at the portion adjacent to the lever fulcrums.

A major object of the present invention is, therefore, to provide a clutch of the type specified, having a high degree of efficiency in the transfer of movement from the operating ring to the pressure plate in the clutch releasing operation.

Another object of the invention is to provide an improved pressure plate of drawn sheet metal having integral driving lugs so formed as to accurately engage with the cover plate to prevent relative rotation between the pressure plate and the cover plate. The invention contemplates, in this respect, a pressure plate that is made very simply and inexpensively and yet has the necessary strength and rigidity. To this end, the plate is formed with a laterally extending annular flange and the driving lugs are formed as continuations of said flange.

A further object of the invention is to provide a novel and improved arrangement of operating ring and release lever, embodying particularly the use of an operating collar of drawn sheet metal having upstruck lugs, supported at both ends, for engagement with the forked ends of the release levers.

The invention further contemplates an improved fulcrum connection between the release lever and the pressure plate.

Other objects, advantages and uses of the invention will become apparent after reading the following specification and claims, and after consideration of the drawing forming a part of the specification, wherein Fig. 1 is a central vertical sectional view of a friction clutch embodying the invention;

Fig. 2 is an elevation of a portion of the same, taken as indicated by the line 2—2 of Fig. 1, showing the cover plate;

Fig. 3 is a vertical sectional view taken as indicated by the line 3—3 of Fig. 1, showing the clutch release lever and associated parts;

Fig. 4 is a detail sectional view taken as indicated by the line 4—4 of Fig. 3; and Fig. 5 is a detail sectional view corresponding to the lower portion of Fig. 1, showing a slightly modified form of the release lever fulcrum.

The illustrative embodiment of the invention shown in the drawing includes a fly-wheel 10 having a clutch face 11, a transmission shaft 12, and a clutch disc assembly, indicated generally at 13, secured upon the splined end 14 of the transmission shaft 12.

A pressure plate P, formed of drawn sheet metal, includes an annular body portion 15, a peripheral flange 16, and an inner flange 17, the flanges 16 and 17 imparting the necessary rigidity to the pressure plate.

A cover plate, indicated generally at C, is also of drawn sheet metal and includes an annular body portion 18 and a rim portion 19 extending substantially at right angles to the body portion 18. The cover plate C is secured to the fly-wheel assembly 10 by means of a flange 20. The body portion 18 of the cover plate is formed with integral cupped regions 21 which receive the ends of pressure springs 22 compressed between the cover plate C and the pressure plate P. The springs 22 normally urge the plate 15 against the clutch disc assembly 13, which is the driven member of the clutch, so as to clamp the clutch disc assembly between the pressure plate and the fly-wheel clutch face 11 in a well known manner.

The pressure plate P and cover plate C are maintained in relatively non-rotatable relationship by driving lugs 23 which are extended through openings 24, lanced in the body portion 18 of the cover plate C. The lugs 23 are formed as continuations of the peripheral flange 16, thus making a very simple construction and yet one that is very strong, the lugs deriving their strength from their relative shortness between their outer ends and their bases (where they join with the flange 16). Thus they are decidedly superior to lugs struck directly from the body portion 15 of the pressure plate.

Clutch release is accomplished by oscillation of a rock shaft 25 by means of a conventional foot pedal (not shown). To the rock shaft 25 is secured an operating fork 26, the bifurcated ends of which engage pins 27 mounted in an operating ring 28. The operating ring 28 is mounted on a sleeve 29 slidably journalled on the transmission shaft 12. On one end of the sleeve 29 (which is preferably a lathe product), is affixed an operating collar 30 having an annular flange 31 formed with a series of ears 32 lying in a plane at right angles to the axis of the collar 30, and extending radially outwardly. Upstruck from the metal of the ears 32 and collar 30 are a series of lugs 33 for coaction with the ends of release levers 34. The collar 30 is die-drawn, and the lugs 33 are die-punched. The lugs 33 derive rigidity from their attachment at both ends to the structure of the collar 30. Furthermore, forming, as they do, bridging connections between the ears 32 and the collar 30, they serve as ties or braces to reenforce the ears 32 so that the latter will bear the strain to which they are subjected without being bent out of position.

Each of the release levers 34 is of stamped sheet metal generally channel-shaped in cross section, and having at its inner end a rounded finger portion 35 adapted to bear against the rear side of an ear 32. The finger portion 35 is bifurcated, as shown, so as to receive one of the lugs 33.

It may be noted at this point that the clutch herein shown is of the "pull" type, i. e., a type in which the inner ends of the release levers are pulled rearwardly by the operating ring in order to effect release of the clutch. This makes it possible to most effectively carry out the object of the invention which has to do with the efficient transmission of release movement from the operating ring to the pressure plate.

Heretofore it has been customary to fulcrum the release levers upon the body portion of the cover plate. I have found that by fulcruming the levers upon an edge of the rim portion 19, forming by cutting away a section of the adjacent body portion 18, that the difficulties which have been hitherto encountered, are eliminated, and yet the levers may be fulcrumed in substantially the plane of the body portion, which is desirable in this type of clutch.

I have concluded, therefore, that these difficulties were caused by a certain amount of yielding of the fulcrum supporting portions of the cover when located in the body portion thereof.

The edge of the rim portion 19 which forms the fulcrum, indicated in the drawing at 36, is defined between the side extremities of a rectangular aperture 37 in the body portion 18 of the cover plate. The outer ends of the release levers 34 are provided with hooks 38 adapted to bear against the fulcrum edges 36.

Movement is transmitted to the pressure plate P by means of three pull links 39 having headed ends 40 secured in the body portion 15. The links 39 extend through openings 41 in the release levers 34.

On either side of each opening 41, the web portion of the release lever 34 is indented as indicated in dotted lines at 42 in Fig. 1, to receive knife-edged fulcrum fingers 43 of a washer 44 through which the link 39 extends. A nut 45, threaded on the threaded end 46 of the link 39, engages the washer 44. Movement is transferred from the indentation 42 of the release levers 34 to the fulcrum fingers 43 of the washer 44, to the nut 45, the links 39 and the pressure plate P. In order to release the clutch, the operating ring 28 is moved rearwardly as indicated by the arrow 47. The ears 32 of the collar 30, in engagement with the finger portions 35 of the release levers, will cause the latter to fulcrum at their outer ends against the fulcrum edges 36 of the rim 19, thus causing the pressure plate C to move away from the clutch disc assembly 13.

The advantage of the invention lies in locating the fulcrum points of the outer ends of the release levers so that the lines of load transmission from the fulcrum points to the fly-wheel assembly 10, lie substantially within or intercepting the rim portion 19 of the cover plate. The rim portion 19 being curved, is ideally adapted to carry these loads without buckling or flexing in any appreciable degree, and as a result, the fulcrum points for the levers are, for the purposes of the invention, completely rigid, and the required amount of plate departure (movement away from the clutch disc assembly) is obtained with definitely less movement of the release levers.

The clutch of the present invention is designed to operate in oil, and under normal conditions it may not be necessary to harden the fulcrum edges 36. However, these edges may, if desired, be hardened or sheathed with wear plates 48 as shown in Fig. 5, so as to reduce wear.

The fulcrum washer 44 is of stamped sheet metal, being thus very simple and inexpensive, and yet provides a knife edge fulcrum connection between the links 39 and the release levers 34 as a result of the novel fulcrum fingers 43 and fulcrum depressions 42, the latter also being simply formed by die embossing.

The knife edges of the fingers 43 are shown as being rounded, and in actual practice will probably be considerably more blunt than conventional knife edge fulcrums such as are used, for example, in weighing scales.

The openings 37 not only serve to form the fulcrum edges 36, but also as guides for the release lever 34, the sides of the levers fitting rather snugly between the side edges of the openings, as indicated in Figs. 1 and 3. The body portion 18 of the cover plate is provided with radially extending depressions 49 registering with the openings 37, and extending from the inner extremity of the body portion approximately halfway to the outer extremity defined by the rim 19. The depressions 49 are defined by shouldered or offset portions 50, and the openings 37 are cut into these offset portions 50 to allow the release levers to project into the openings 37 from the depressions 49 through which they extend.

I claim:

1. In a friction clutch, a cover plate including a body portion and a peripheral rim, said plate being of drawn sheet metal and having in said body portion an aperture which extends to the rim to provide a fulcrum edge in said rim, and a release lever fulcrumed against said edge.

2. In a friction clutch, a cover plate including a body portion and a peripheral rim, said cover plate being of drawn sheet metal and being provided with an aperture in said body portion extending to said rim to provide a fulcrum edge in said rim, and a release lever having at its outer end a hooked portion receiving and fulcrumed against said edge.

3. In a friction clutch, a drawn sheet metal cover plate including a body portion and a rim portion, having in said body portion an aperture extending into said rim and having a fulcrum member located at an edge of said rim portion formed by said aperture, and a clutch release lever lying mainly outside said cover plate and fulcrumed against said fulcrum member.

4. In a friction clutch, a fly-wheel having a clutch face, a drawn sheet metal cover plate including a body portion lying substantially parallel to said clutch face, and a curved rim portion extending substantially at right angles to said clutch face, and a release lever fulcrumed directly against the axial extremity of said rim portion opposite said flywheel and lying mainly outside of said cover plate.

5. In a friction clutch, a transmission shaft, an operating collar through which said shaft extends, said collar being of drawn sheet metal and having out-turned lever engaging ears and integral lever positioning lugs upstruck from the metal joining said collar and ears, each lug being attached at one end to an ear and at its other end to the collar, and clutch release levers having bifurcated end portions engaged against said ears and receiving said lugs.

6. In a friction clutch, an operating collar including a cylindrical portion and a lever engaging ear bent laterally from one end of said cylindrical portion, a combined lever positioning lug and bracing tie upstruck from the metal joining said ear and cylindrical portion, and a clutch release lever having a bifurcated end portion engaged against said ear and receiving said combined lug and tie.

7. An operating collar for a friction clutch formed of drawn sheet metal, comprising a cylindrical portion and a release lever engaging ear bent laterally from one end of said cylindrical portion, and a tie member for bracing said ear upstruck from the metal of the ear and the cylindrical portion, extending diagonally between the ear and cylindrical portion, joined at one end to the ear and joined at its other end to the cylindrical portion.

8. In a friction clutch, a cover plate including a body portion and a rim portion, said body portion having a radial aperture extending to said rim portion to form a fulcrum edge, and a clutch release lever fulcrumed against said edge and lying partly within said aperture, the sides of the lever being engaged by the side edges of the aperture so as to position said lever circumferentially with respect to said cover plate.

9. In a friction clutch, a pressure plate of stamped sheet metal including a body portion and a peripheral flange extending substantially at right angles thereto, a cover plate including a body portion adjacent the edge of said flange, said body portion having an aperture registering with said flange, and a driving lug forming an aligned continuation of said flange and extending through said aperture.

10. In a friction clutch, a pressure plate of stamped sheet metal including a body portion and an annular flange extending substantially at right angles thereto, a cover plate including a body portion adjacent the edge of said flange, said body portion having an aperture registering with said flange, and a driving lug forming an aligned continuation of said flange and extending through said aperture.

11. In a friction clutch, a drawn sheet metal cover plate including a body portion and a rim portion, having in said body portion an aperture extending into said rim, and having a fulcrum member located at an edge of said rim portion formed by said aperture, and a clutch release lever fulcrumed against said fulcrum member.

HAROLD V. REED.

CERTIFICATE OF CORRECTION.

Patent No. 2,217,078.  October 8, 1940.

HAROLD V. REED.

It is hereby certified that error appears in the printed specification of the above numbered patent requiring correction as follows: Page 2, first column, line 39, for the word "forming" read --formed--; and that the said Letters Patent should be read with this correction therein that the same may conform to the record of the case in the Patent Office.

Signed and sealed this 12th day of November, A. D. 1940.

(Seal)
Henry Van Arsdale,
Acting Commissioner of Patents.